US011037219B2

(12) United States Patent
Dauberman et al.

(10) Patent No.: US 11,037,219 B2
(45) Date of Patent: Jun. 15, 2021

(54) INTERACTIVE TIRE WALL AND PURCHASE METHOD

(71) Applicant: The Goodyear Tire & Rubber Company, Akron, OH (US)

(72) Inventors: Michael Eric Dauberman, North Canton, OH (US); Seth Barnett Klugherz, Solon, OH (US); Deborah Ruth Goff, Somerville, MA (US); Annelie Rode, Boston, MA (US); Brenton Gentry Eveleth, Somerville, MA (US); Andrew Neil Shaw, Boston, MA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 258 days.

(21) Appl. No.: 16/455,839

(22) Filed: Jun. 28, 2019

(65) Prior Publication Data

US 2020/0410565 A1 Dec. 31, 2020

(51) Int. Cl.
*G06K 15/00* (2006.01)
*G06Q 30/06* (2012.01)
*G06Q 10/10* (2012.01)
*G06K 7/14* (2006.01)

(52) U.S. Cl.
CPC ....... *G06Q 30/0623* (2013.01); *G06K 7/1413* (2013.01); *G06K 7/1417* (2013.01); *G06Q 10/1095* (2013.01)

(58) Field of Classification Search
CPC ........... G06Q 30/0623; G06Q 10/1095; G06K 7/1417; G06K 7/1413

USPC ......................................... 235/383, 385, 375
See application file for complete search history.

(56) References Cited

U.S. PATENT DOCUMENTS

| 4,673,932 | A | * | 6/1987 | Ekchian | ............... | G06Q 10/087 |
| | | | | | | 340/10.32 |
| 5,640,193 | A | | 6/1997 | Wellner | | |
| 5,978,773 | A | | 11/1999 | Hudetz et al. | | |
| 5,979,757 | A | | 11/1999 | Tracy et al. | | |
| 5,996,892 | A | * | 12/1999 | Meadows | ............... | B29C 33/14 |
| | | | | | | 235/462.01 |
| 6,141,666 | A | | 10/2000 | Tobin | | |
| 6,199,048 | B1 | | 3/2001 | Hudetz et al. | | |
| 6,993,573 | B2 | | 1/2006 | Hunter | | |
| 7,153,381 | B2 | * | 12/2006 | Majumdar | ............ | B60C 13/001 |
| | | | | | | 156/116 |

(Continued)

FOREIGN PATENT DOCUMENTS

WO 0233518 A8 2/2003

*Primary Examiner* — Jamara A Franklin
(74) *Attorney, Agent, or Firm* — Edward T. Kennedy

(57) ABSTRACT

An interactive tire wall includes a vertical wall that is formed with a plurality of openings. Tires are mounted in the openings on the vertical wall, and placards are mounted on the vertical wall, in which each placard is adjacent and corresponds to a respective tire. A machine-readable code is formed on each placard and corresponds to a respective one of the tires. The code is capable of being read by an imaging device contained in a portable device that is connected to the Internet. When the machine-readable code is read by the imaging device, data in the machine-readable code directs a browser or a software application stored on the portable device to a web site containing purchasing information for the selected tire. A method of purchasing tires is also provided.

18 Claims, 6 Drawing Sheets

(56) References Cited

U.S. PATENT DOCUMENTS

| | | |
|---|---|---|
| 7,156,311 B2 | 1/2007 | Attia et al. |
| 7,387,250 B2 | 6/2008 | Muni |
| 7,963,441 B2 | 6/2011 | Emmons et al. |
| 9,047,634 B2 | 6/2015 | Pappas et al. |
| 9,262,781 B2 | 2/2016 | Mackinnon Keith |
| 9,824,624 B2 | 11/2017 | Howard et al. |
| 9,911,377 B2 | 3/2018 | Howard et al. |
| 9,934,506 B2 | 4/2018 | Mackinnon Keith |
| 10,121,133 B2 | 11/2018 | Nelms et al. |
| 10,169,626 B2 | 1/2019 | Britt et al. |
| 10,198,988 B2 | 2/2019 | Howard et al. |
| 10,204,368 B2 | 2/2019 | Ainsworth, III et al. |
| 2004/0103034 A1* | 5/2004 | Reade ................ G06Q 20/343 705/16 |
| 2005/0039365 A1* | 2/2005 | Rosa ...................... G09F 3/20 40/649 |
| 2007/0162350 A1 | 7/2007 | Friedman |
| 2011/0004533 A1 | 1/2011 | Soto et al. |
| 2020/0164531 A1* | 5/2020 | Wagner .............. G05B 19/4183 |

\* cited by examiner

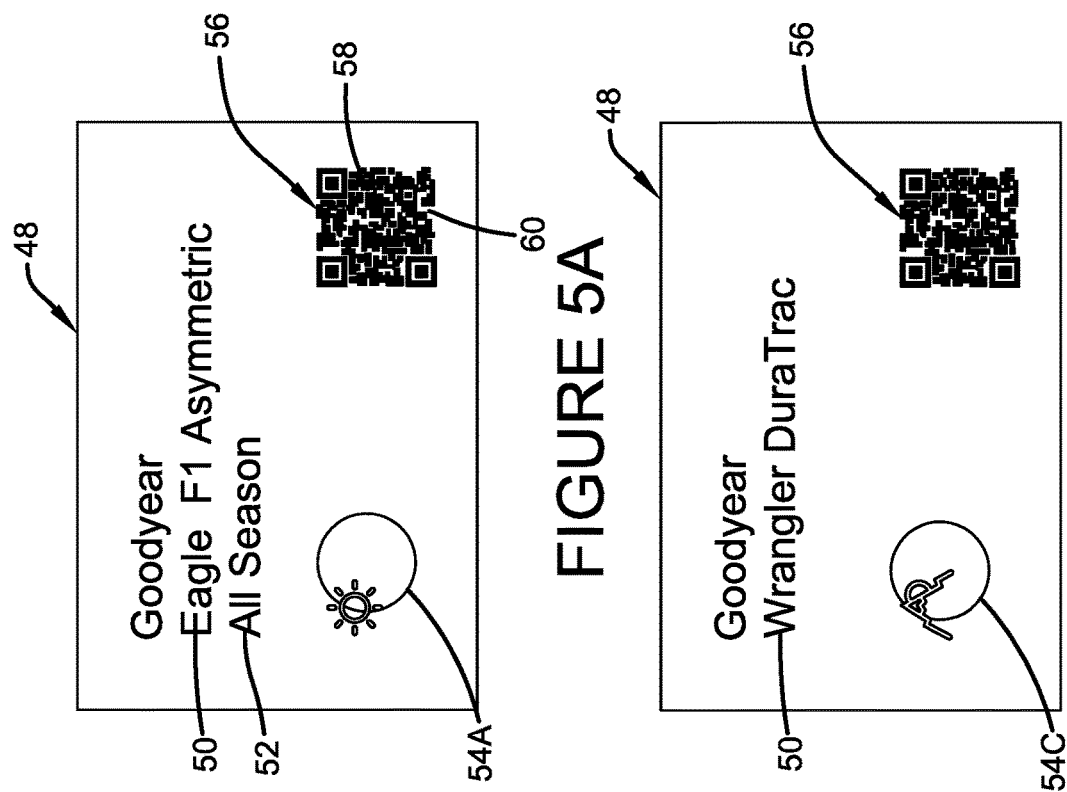
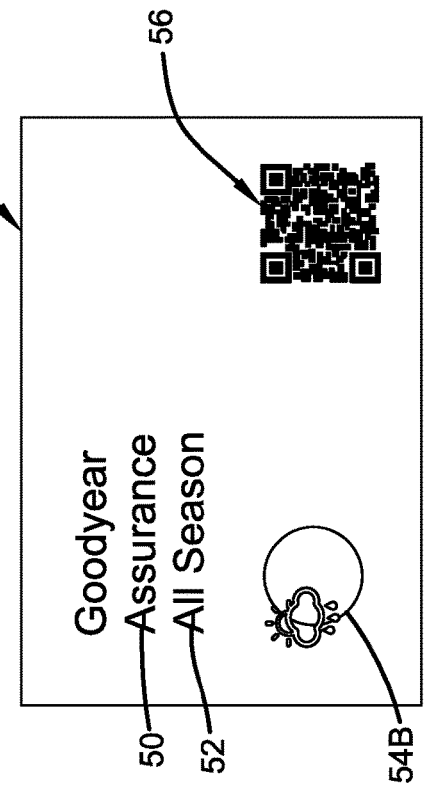
FIGURE 5A
FIGURE 5B
FIGURE 5C

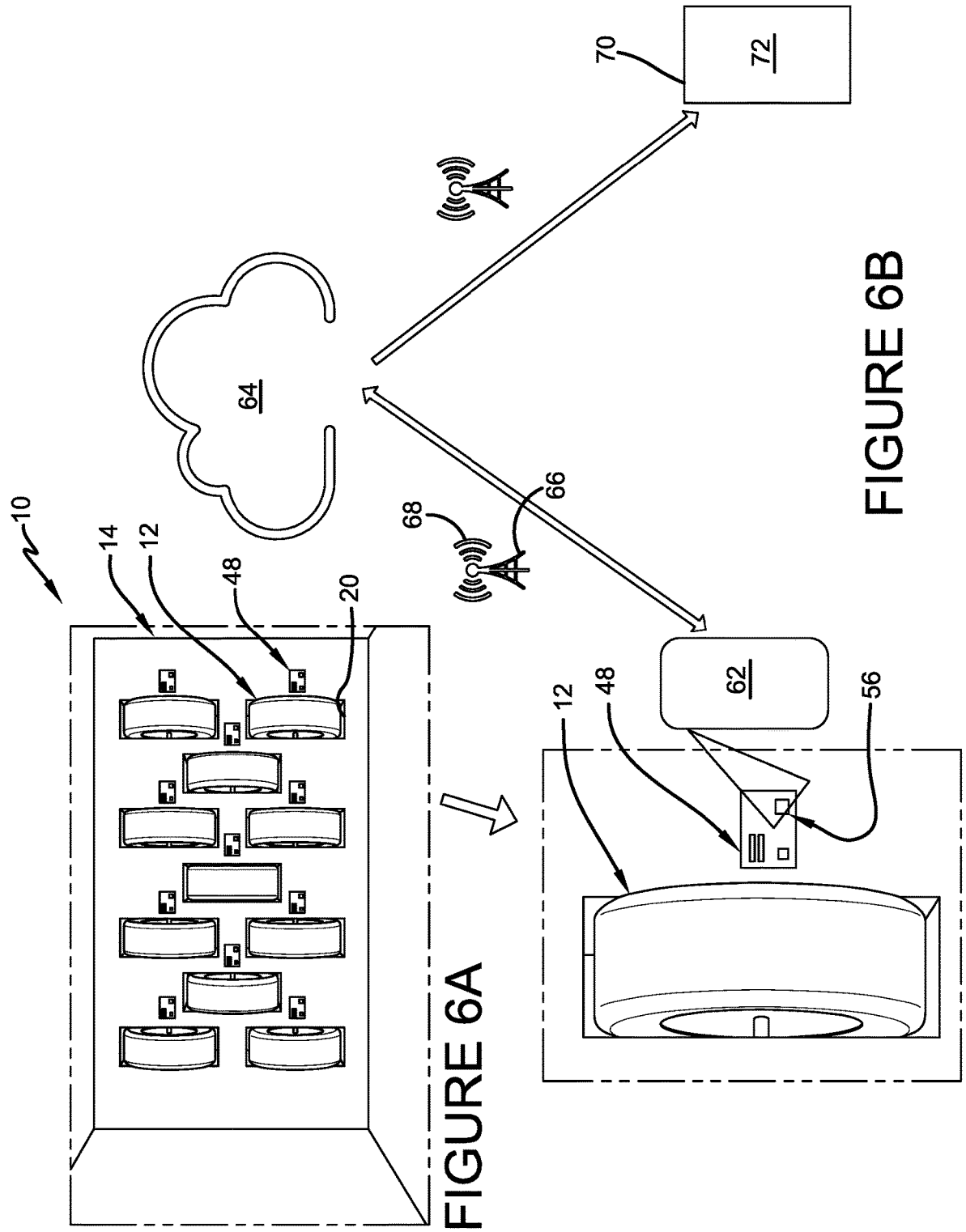

INTERACTIVE TIRE WALL AND PURCHASE METHOD

FIELD OF THE INVENTION

The invention relates to the sale of vehicle tires for purchase by a consumer. More particularly, the invention is directed to a structure that provides a physical display of tires which enables consumers to view the tires in person, while also providing a configuration that minimizes retail space and enables easy and convenient online purchasing of selected tires by a consumer.

BACKGROUND OF THE INVENTION

Conventional pneumatic tires are designed to perform for relatively long periods of time. Nevertheless, such tires are each formed with a ground-engaging tread that necessarily wears down over the life of the tire. When the tread wears down to a certain level, replacement of the tire is recommended.

In addition, pneumatic tires are subject to air pressure losses due to puncture by nails and other sharp objects, temperature changes, and/or diffusion of air through the tire itself. Such air pressure losses or damage to a tire may lead to a need to replace the tire.

Traditionally, when a consumer has needed to replace one or more tires, the consumer has had to visit a physical tire store that includes a commercial garage with a storefront. Tire sales at this type of establishment may enable a customer to potentially view different tires in person. However, such establishments also require a significant amount of storage space to maintain an inventory of tires of different types and sizes, which is very difficult and expensive in certain geographic areas, such as urban environments.

In addition, such establishments typically lack a convenient and direct means to enable a consumer to see a physical tire while also easily determining if a selected tire fits the consumer's vehicle. It may also be difficult for a consumer to view the inventory availability of the selected tire and/or a clear price for that tire. Rather than directly seeing such information, the consumer must typically go to a technician or cashier, who in turn confirms if a selected tire fits a specific vehicle, checks inventory availability of the tire, and/or verifies the price of the tire. This can be a time-consuming process, particularly when multiple consumers are attempting to review and/or purchase tires at the same time.

More recently, as an alternative, tires have been able to be purchased through the Internet, where consumers can visit certain tire-related web sites. Upon visiting such a web site, the consumer is able to select tires based on an image and a written description, and may perform an online purchase of the tires. However, the consumer is not able to view actual tires in person with such art online purchasing. The lack of ability to view an actual tire may undesirably create confusion on the part of the consumer. For example, the consumer may not like the appearance or fit of the tire once he or she finally sees it in person, after the purchase has occurred.

As a result, there is a need in the art for an apparatus that provides a physical display of tires that enables consumers to view the tires in person, while also providing a configuration which minimizes retail space and enables easy and convenient purchasing of selected tires by a consumer.

SUMMARY OF THE INVENTION

According to an aspect of an exemplary embodiment of the invention, an interactive wall includes a vertical wall that is formed with a plurality of openings. A plurality of tires is mounted on the vertical wall, in which each tire is partially received in a respective one of the openings. A plurality of placards is mounted on the vertical wall in which each one of the placards is adjacent and corresponds to a respective one of the tires. A machine-readable code is formed on each placard and corresponds to a respective one of the tires, in which the code is capable of being read by an imaging device contained in a portable device that is connected to the Internet. When the machine-readable code corresponding to a selected one of the tires is read by the imaging device, data in the machine-readable code directs at least one of a browser and a software application stored on the portable device to a web site containing purchasing information for the selected one of the tires.

According to an aspect of another exemplary embodiment of the invention, a method of purchasing tires includes providing an interactive tire wall in which the interactive tire wall includes a plurality of tires mounted on a vertical wall, a plurality of placards in which each placard corresponds to a respective one of the tires, and a machine-readable code formed on each placard. A consumer is enabled to scan with a portable device the machine-readable code from a selected placard corresponding to a selected one of the plurality of tires. At least one of a browser and a software application stored on the portable device is directed to a web site. A page of the web site is opened on the portable device to display information about the selected tire. A consumer is enabled to verify on the web site, using the portable device, compatibility of the selected tire with a vehicle. If the selected tire is compatible with the vehicle, price and availability information for the selected tire is displayed on the portable device. The consumer is enabled to purchase the selected tire directly through the web site using the portable device.

BRIEF DESCRIPTION OF THE DRAWINGS

The invention will be described by way of example and with reference to the accompanying drawings, in which:

FIG. 5A is an enlarged front elevational view of a first exemplary placard employed on the interactive tire wall shown in FIG. 2;

FIG. 5B is an enlarged front elevational view of a second exemplary placard employed on the interactive tire wall shown in FIG. 2;

FIG. 5C is an enlarged front elevational view of a third exemplary placard employed on the interactive tire wall shown in FIG. 2;

FIG. 6A is a reduced front elevational view of the interactive tire wall shown in FIG. 2;

FIG. 6B is a schematic representation of the web-based interactivity of the interactive tire wall shown in FIG. 2.

DETAILED DESCRIPTION OF THE INVENTION

Turning to FIGS. 1 through 7, an exemplary embodiment of an interactive tire wall of the present invention is indicated generally at 10. The interactive tire wall 10 includes a plurality of tires 12 of different types that are mounted on a vertical wall 14.

Figure 1:
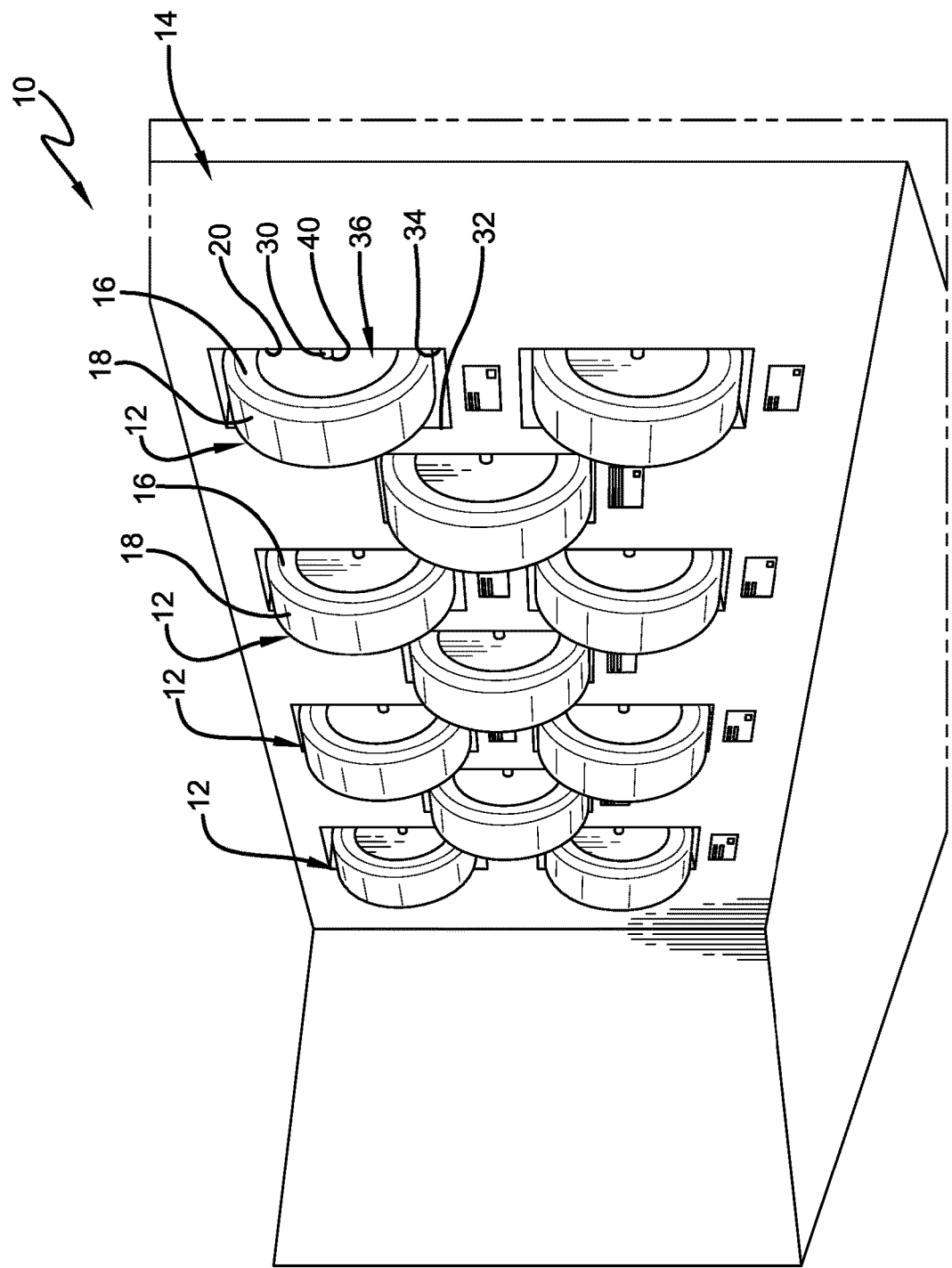
FIG. 1 is a schematic perspective view of a first exemplary configuration of an exemplary embodiment of an interactive tire wall of the present invention.
Figure 2:
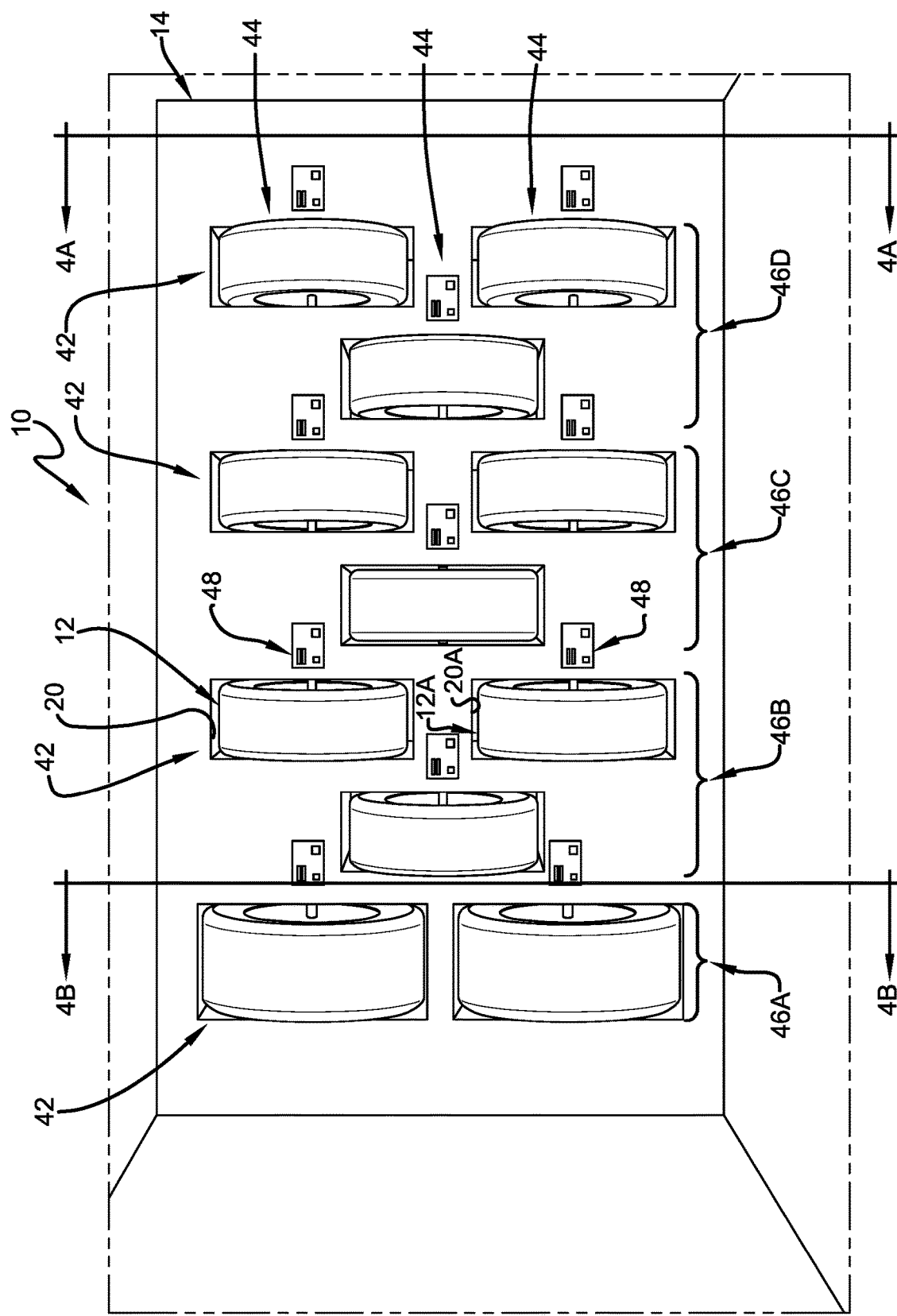
FIG. 2 is a front elevational view of a second exemplary configuration of an exemplary embodiment of an interactive tire wall of the present invention.
Figure 4B:
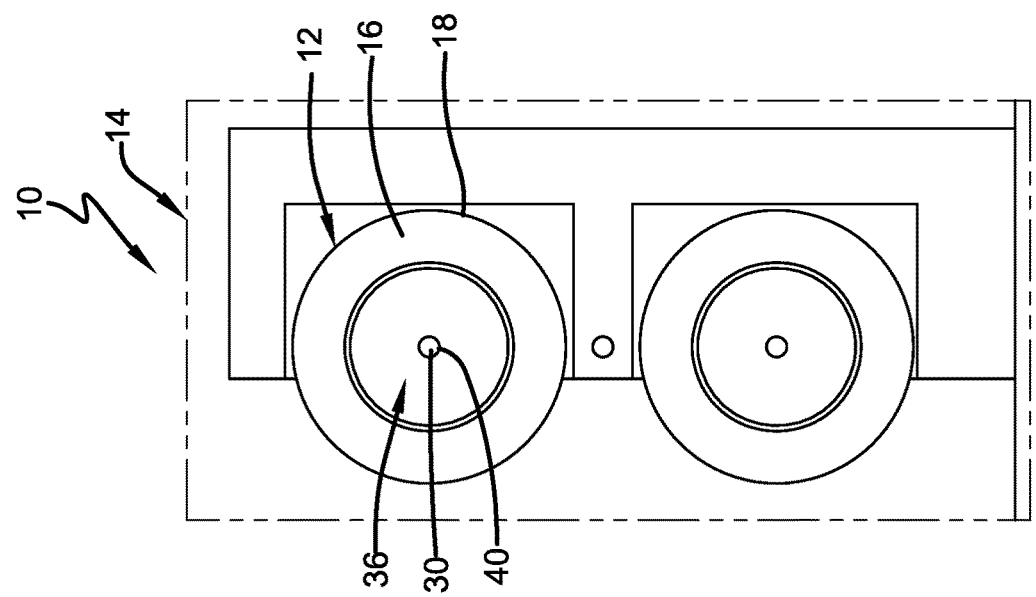
FIG. 4B is a cross-sectional view of a portion of the interactive tire wall shown in FIG. 2 taken along line 4B-4B.
Figure 4A:
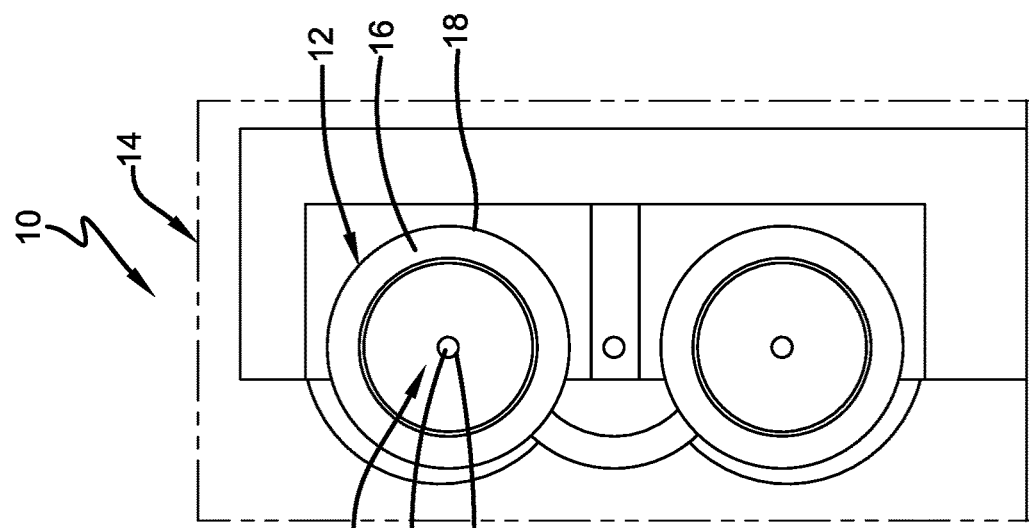
FIG. 4A is a cross-sectional view of a portion of the interactive tire wall shown in FIG. 2 taken along line 4A-4A.
Figure 3:
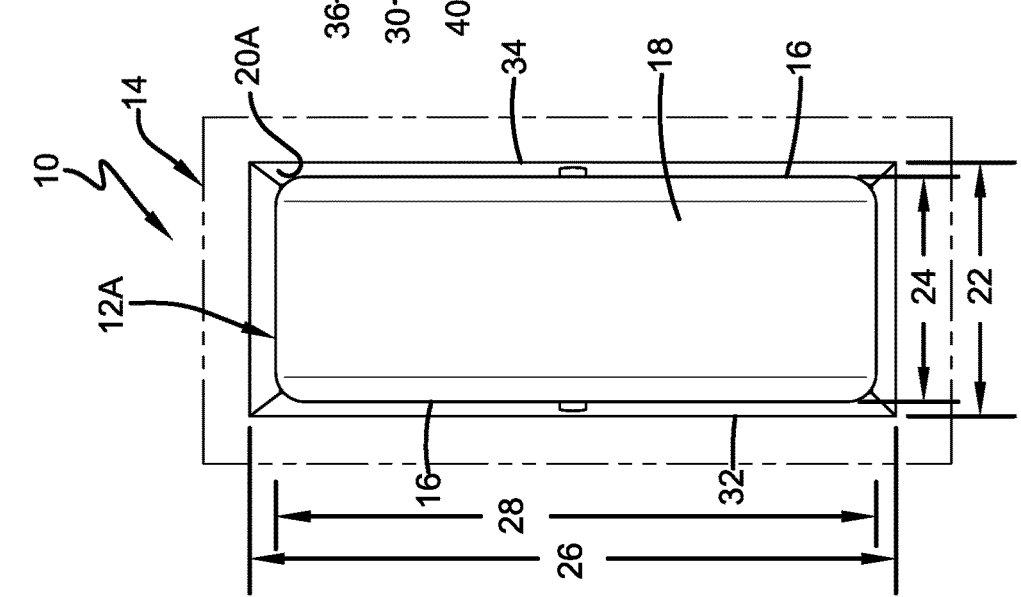
FIG. 3 is an enlarged front elevational view of a portion of the interactive tire wall shown in FIG. 2.

FIG. 1 shows a first exemplary configuration of the interactive tire wall 10, and FIG. 2 shows a second exemplary configuration of the interactive tire wall. The difference between the configuration shown in FIG. 1 and the configuration shown in FIG. 2 is the arrangement of the tires 12 on the wall 14. For the purpose of convenience, reference herein shall be made to the interactive tire wall 10 with the understanding that such reference includes both of the configurations shown in FIGS. 1 and 2.

With particular reference to FIGS. 1 through 4B, each of the tires 12 is mounted on the vertical wall 14 in a vertical orientation, thus matching the orientation of the tires when mounted on a vehicle. Each tire 12 includes a pair of each sidewall 16 and a tread 18. To enable a consumer to view the entire exterior of the sidewalls 16 and/or the tread 18 in the same manner as they would appear on a vehicle, each tire 12 preferably is rotatably mounted on the vertical wall 14. To facilitate such mounting, the wall 14 is formed with a plurality of openings 20, each one of which partially receives a respective one of the tires 12.

Reference now shall be made to an exemplary opening 20A and a selected tire 12A that is received in the exemplary opening, with the understanding that such reference applies to all of the openings 20 and to each tire 12 received in each respective opening on the interactive tire wall 10.

The opening 20A includes a width 22 that is slightly wider than a width 24 of the selected tire 12A. The opening 20A also includes a height 26 that is slightly larger than a height or diameter 28 of the selected tire 12A. In this manner, the selected tire 12A is received in the corresponding opening 20A. Preferably, a rod 30 extends from a first sidewall 32 adjacent the opening 20A to a second sidewall 34 adjacent the opening. The selected tire 12A is mounted on a hub 36. The hub 36 is formed with a central opening 40 that allows the rod 30 to extend through the hub and thus rotatably mount the selected tire 12A in the opening 20A. It is to be understood that the hub 36 may be a faux hub formed of plastic, rubber or metal for displaying the tire 12A, rather than a hub which actually mounts on a vehicle. Alternatively, the hub 36 may be a hub that is capable of being mounted on a vehicle.

In this manner, the tire 12A is partially received in the opening 20A, thereby enabling a consumer to stand in close proximity to the interactive tire wall 10 to view, touch and/or rotate the tire. Preferably, the selected tire 12A is mounted on the vertical wall 14 in a manner that enables the tire to be easily rotated by a consumer and then return to the same rotational position. For example, the interior of the selected tire 12A or the hub 36 may be equipped with a counterweight that causes the tire to return to a predetermined position after it is rotated.

The interactive tire wall 10 preferably displays tires 12 according to a consumer-friendly configuration along columns 42 and rows 44, which may thus form sections 46. For example, a first section 46A may display types of all-terrain tires 12 for pickup trucks and large sport utility vehicles. A second section 46B may display several types of all-season tires 12 for sedans, smaller sport utility vehicles, compact cars and other vehicles. A third section 46C may display several types of performance tires 12 or summer tires for sports cars, sedans and other vehicles. A fourth section 46D may display budget tires 12 for sedans, smaller sport utility vehicles, compact cars and other vehicles.

The specific number of tires 12 displayed on the interactive tire wall 10 depends on the particular size of the vertical wall 14 and the number of tires to be displayed. Because the tires 12 are actual tires, rather than images of tires or mock-ups of tires, the width and height of the vertical wall 14 may be adjusted for particular display considerations. For example, in a small retail space, the vertical wall 14 may be of a width and height to enable the interactive tire wall 10 to display from about four (4) tires 12 to about twenty (20) tires.

The interactive tire wall 10 also includes placards 48 that are mounted on the vertical wall 14. More particularly, a placard 48 is mounted adjacent each respective tire 12. Each placard 48 corresponds to its respective adjacent tire 12 and provides information to the consumer about that tire. It is to be understood that each placard 48 may be of any known form, including printed form or electronic/digital form.

Turning to FIGS. 5A through 5C, each placard 48 preferably includes a model name 50 of the respective tire 12 (FIG. 2) and may also list a category or type 52 of the tire, such as all-terrain, all-season, winter, summer, performance, budget and the like. Each placard 48 may also include a graphic 54 that illustrates the tire type and/or use. For example, a graphic such as 54A that shows only a sun may indicate a summer or performance tire 12; a graphic such as 54B that shows a sun and a cloud with rain may indicate an all-weather tire; and a graphic such as 54C that shows a mountain may indicate an all-terrain tire. Each graphic 54 may also be color-coded to enable easy identification by a consumer.

Each respective placard 48 preferably also includes a machine-readable code 56 that corresponds to the adjacent tire 12. The machine-readable code 56 may be a bar code or a quick response (QR) code. The code 56 shown in FIGS. 5A through 5C by way of example is a QR code, which is a unique graphical code that stores data in patterns of dark squares 58 that are arranged in a grid on a light background 60.

With reference now to FIGS. 6A and 6B, the QR code 56 on the placard 48 adjacent a selected one of the tires 12 is electronically read by an imaging device, such as a camera, contained in a mobile or portable device 62. Exemplary portable devices 62 include a consumer's mobile or cellular phone, a consumer's tablet computer, and/or a tablet computer that may be provided in the proximity of the interactive tire wall 10.

The QR code 56 thus is electronically read or scanned using the portable device 62, and is processed to interpret the image. Data is extracted from patterns in the image of the code 56 by software that is stored on or accessed by the portable device 62. Preferably, the portable device 62 includes a software application, known as an app, which enables a web browser or another app to open on the portable device.

As is known to those skilled in the art, the portable device 62 is connected to the Internet 64. For example, the portable device 62 may include an antenna that electronically communicates with a cell tower 66 through radio waves 68, thereby facilitating the connection of the portable device 62 to the Internet 64. A wireless fidelity (Wi-Fi) network may also be employed in the proximity of the interactive tire wall 10 to facilitate connection of the portable device 62 to the Internet 64.

Using the connection of the portable device 62 to the Internet 64, the web browser or app on the portable device is directed by the data in the QR code 56 to a specific web site 70, and preferably to a specific page 72 on the web site that contains information for the selected tire 12, including descriptive information and purchasing information. The consumer is then able to view and interact with the page 72 on the web site 70 through the portable device 62.

Figure 7:
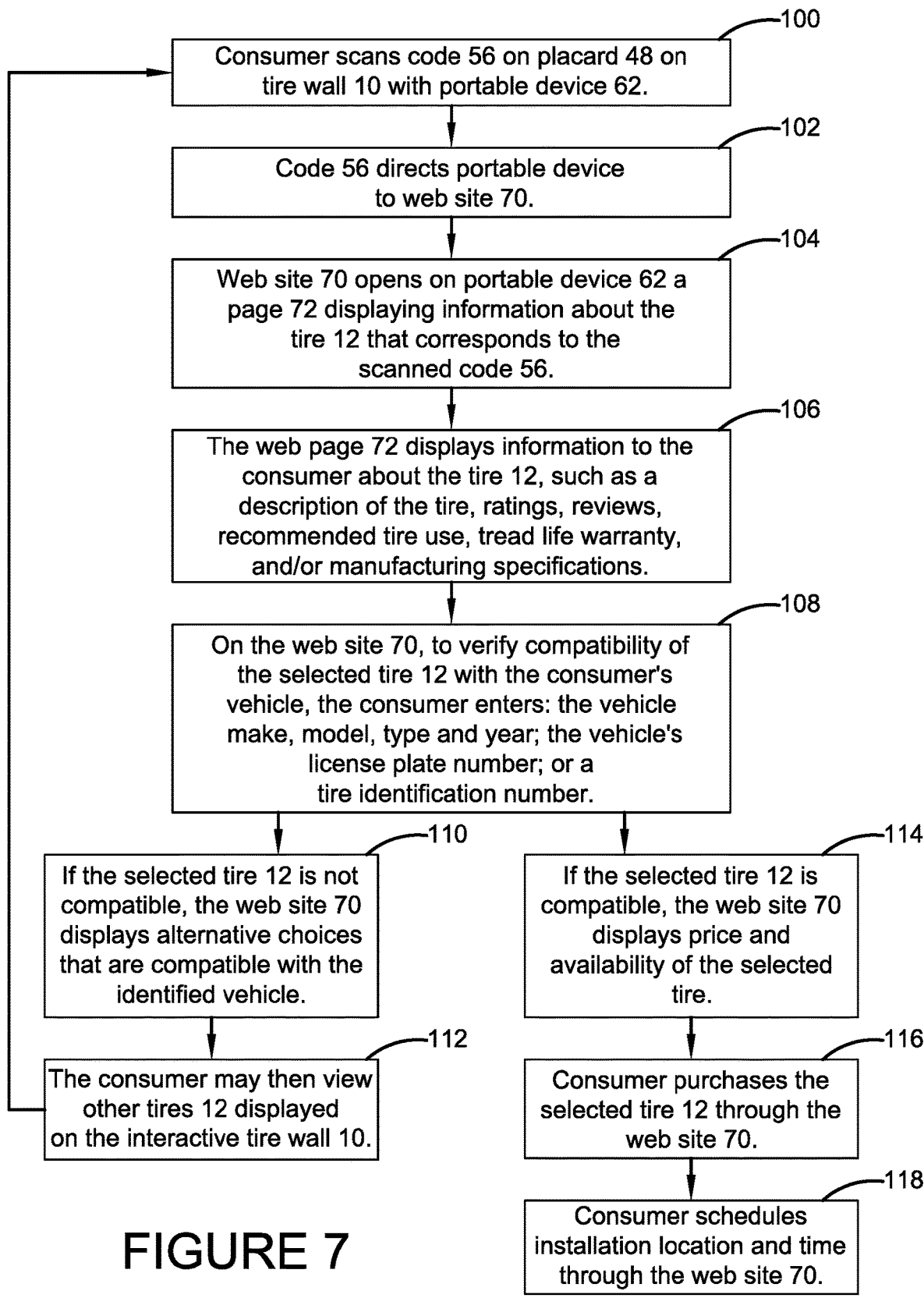
FIG. 7 is a flow diagram showing steps of an exemplary embodiment of a purchasing method of the present invention.

With additional reference to FIG. 7, a flow diagram illustrates exemplary steps that are employed to purchase a selected tire 12 using the interactive tire wall 10. In step 100, as described above, a consumer scans the QR code 56 on the placard 48 that is adjacent a selected one of the tires 12 with the portable device 62. The QR code 56 directs the portable device 62 to the web site 70, step 102. The web page 72 that displays information about the tire 12 which corresponds to the scanned code 56 opens on the portable device 62, step 104. The web page 72 displays information to the consumer about the tire 12, such as a description of the tire, ratings, reviews, recommended tire use, tread life warranty, and/or manufacturer specifications, step 106. The consumer may thus easily retrieve and view a variety of information about the selected tire 12.

The consumer may then verify compatibility of the selected tire 12 with the wheels of his or her vehicle, which is referred to as compatibility with the vehicle. For the verification, on the web site 70 using the portable device 62, the consumer enters identifying information that includes at least one of: the make, model, type and year of the vehicle; the license plate number of the vehicle; or a tire identification number, step 108. The tire identification number is a code associated with the tire 12 that includes tire size information according to government regulations. The tire identification number may be obtained from the sidewall of an existing tire on the vehicle, the sticker in the driver's door jamb of the vehicle, or the vehicle window sticker. Once the information is entered in step 108, the web site 70 accesses a database to determine if the identified vehicle is compatible with the selected tire 12.

If the selected tire 12 is not compatible with the consumer's vehicle, the web site 70 displays alternative tire choices that are compatible with the identified vehicle, step 110. The consumer may then view other tires 12 displayed on the interactive tire wall 10, step 112, and easily repeat steps 100 through 108 to locate a tire that is compatible with his or her vehicle.

If the selected tire 12 is compatible with the consumer's vehicle, the web site 70 displays price and availability information for the selected tire, step 114. The consumer is then able to purchase the selected tire 12 directly through the web site 70, step 116. Upon completion of the online purchase of the selected tire 12, the web site 70 enables the customer to schedule a date, time and location for installation of the tire, step 118. Exemplary locations for installation of the tire 12 include a valet service that may pick the vehicle up at the consumer's current location or other predetermined location, a mobile tire installation unit that may visit the consumer's current location or other predetermined location, or the consumer taking the vehicle to a service center.

In this manner, the interactive tire wall 10 of the present invention integrates a physical display of tires 12 with a convenient online purchasing experience. The interactive tire wall 10 provides a physical display of tires 12 that enables consumers to view and touch the tires in person which minimizes retail space. The interactive tire wall 10 also provides a machine-readable code 56 that directs a portable device 62, such as the consumer's mobile phone, to a page 72 on a web site 70 which corresponds to a selected tire 12. Such a configuration enables easy and convenient purchasing of selected tires 12 by a consumer.

The present invention also includes a method of purchasing tires 12. The method includes steps in accordance with the description that is presented above and shown in FIGS. 1 through 7.

It is to be understood that the structure of the above-described interactive tire wall 10 and purchase method may be altered or rearranged, or components or steps known to those skilled in the art omitted or added, without affecting the overall concept or operation of the invention. For example, any number of tires 12 or arrangement of tires on the vertical wall 14 may be employed without affecting the overall concept or operation of the invention.

The invention has been described with reference to preferred embodiments. Potential modifications and alterations may occur to others upon a reading and understanding of this description. It is to be understood that all such modifications and alterations are included in the scope of the invention as set forth in the appended claims, or the equivalents thereof.

What is claimed is:

1. An interactive tire wall, comprising:
 a vertical wall being formed with a plurality of openings;
 a plurality of tires mounted on the vertical wall, wherein each tire is partially received in a respective one of the openings;
 a plurality of placards being mounted on the vertical wall, each one of the placards being adjacent and corresponding to a respective one of the tires;
 a machine-readable code formed on each placard and corresponding to a respective one of the tires, wherein the code is capable of being read by an imaging device contained in a portable device that is connected to the Internet; and
 whereby when the machine-readable code corresponding to a selected one of the tires is read by the imaging device, data in the machine-readable code directs at least one of a browser and a software application stored on the portable device to a web site containing purchasing information for the selected one of the tires.

2. The interactive tire wall of claim 1, wherein each one of the plurality of tires is mounted on the vertical wall in a vertical direction.

3. The interactive tire wall of claim 1, wherein each one of the plurality of tires is rotatably mounted on the vertical wall.

4. The interactive tire wall of claim 3, wherein:
 each one of the plurality of tires is mounted on a respective hub;
 each one of the plurality of openings includes a rod extending across the opening from a first sidewall adjacent the opening to a second sidewall adjacent the opening; and
 the rod extends through a central opening formed in the hub.

5. The interactive tire wall of claim 3, wherein at least one of each hub and an interior of each tire includes a counterweight to return the respective tire to a predetermined position after it is rotated.

6. The interactive tire wall of claim 1, further comprising a plurality of sections, wherein each section displays a particular type of tires.

7. The interactive tire wall of claim 6, wherein the types of tires include at least one of all-terrain tires, all-season tires, performance tires, summer tires, and budget tires.

8. The interactive tire wall of claim 1, wherein each placard includes at least one of a model name of the corresponding tire, a category of the corresponding tire, a type of the corresponding tire, and a graphic illustrating a type of the corresponding tire.

9. The interactive tire wall of claim 1, wherein the machine-readable code includes at least one of a bar code and a quick response code.

10. The interactive tire wall of claim 1, wherein the portable device includes at least one of a mobile phone and a tablet computer.

11. The interactive tire wall of claim 1, wherein the web site includes a web page containing information for the selected tire.

12. A method of purchasing tires, the method including the steps of:
    providing an interactive tire wall, wherein the interactive tire wall includes a plurality of tires mounted on a vertical wall, a plurality of placards in which each placard corresponds to a respective one of the tires, and a machine-readable code formed on each placard;
    enabling a consumer to scan with a portable device the machine-readable code from a selected placard corresponding to a selected one of the plurality of tires;
    directing at least one of a browser and a software application stored on the portable device to a web site;
    opening on the portable device a page of the web site to display information about the selected tire;
    enabling a consumer to verify on the web site, using the portable device, compatibility of the selected tire with a vehicle;
    if the selected tire is compatible with the vehicle, displaying price and availability information for the selected tire on the portable device; and
    enabling the consumer to purchase the selected tire directly through the web site using the portable device.

13. The method of purchasing tires of claim 12, wherein the information about the selected tire that is displayed includes at least one of a description of the selected tire, ratings of the selected tire, reviews of the selected tire, recommended use of the selected tire, tread life warranty of the selected tire, and manufacturer specifications of the selected tire.

14. The method of purchasing tires of claim 12, wherein the step of enabling a consumer to verify compatibility of the selected tire with a vehicle further comprises allowing the consumer to enter a make, model, type and year of the vehicle.

15. The method of purchasing tires of claim 12, wherein the step of enabling a consumer to verify compatibility of the selected tire with a vehicle further comprises allowing the consumer to enter a license plate number of the vehicle.

16. The method of purchasing tires of claim 12, wherein the step of enabling a consumer to verify compatibility of the selected tire with a vehicle further comprises allowing the consumer to enter a tire identification number.

17. The method of purchasing tires of claim 12, wherein if the selected tire is not compatible with the vehicle, the method further comprising the step of displaying on the portable device alternative tire choices that are compatible with the vehicle.

18. The method of purchasing tires of claim 12, further comprising the step of enabling the customer to schedule a date, time and location for installation of the selected tire.

* * * * *